United States Patent [19]

Danemar et al.

[11] 4,095,264  
[45] June 13, 1978

[54] CAPACITOR BANK

[75] Inventors: Ake Danemar, Lidingo; Arne Johansson, Grangesberg; Owe Nerf, Farsta, all of Sweden

[73] Assignee: Asea AB, Vasteras, Sweden

[21] Appl. No.: 721,500

[22] Filed: Sep. 8, 1976

[30] Foreign Application Priority Data

May 7, 1976 Sweden ............................ 7605216

[51] Int. Cl.$^2$ .............................................. H01G 1/08
[52] U.S. Cl. ...................................... 361/274; 361/329
[58] Field of Search ............... 361/272, 274, 275, 329, 361/328

[56] References Cited

U.S. PATENT DOCUMENTS

| 543,978 | 8/1895 | Bradley | 361/328 |
|---|---|---|---|
| 1,255,597 | 2/1918 | Giles | 361/275 |
| 1,346,694 | 7/1920 | Bayles | 361/329 |
| 1,852,718 | 4/1932 | Haefely | 361/329 |
| 1,960,415 | 5/1934 | Miller | 361/274 |
| 2,237,814 | 4/1941 | Foster | 361/274 |
| 2,297,200 | 9/1942 | Buschbeck | 361/274 |
| 3,689,809 | 9/1972 | McDonald | 361/329 |
| 3,911,334 | 10/1975 | Brayshaw | 361/274 |

FOREIGN PATENT DOCUMENTS

| 613,065 | 8/1926 | France | 361/274 |
|---|---|---|---|
| 1,942,088 | 3/1970 | Germany | 361/274 |
| 189,350 | 10/1922 | United Kingdom | 361/274 |

*Primary Examiner*—Elliot A. Goldberg
*Attorney, Agent, or Firm*—Watson, Cole, Grindle & Watson

[57] ABSTRACT

A capacitor bank for use in high voltage electric plants such as series or shunt capacitors or in filter circuits for high voltage direct current plants. The capacitor bank comprises a number of capacitor units in a closed tank containing a gas for electric insulation and for regulating the temperature in the tank. Each of the capacitor units comprise a closed casing provided with bushings for current inlet and outlet, a number of capacitor elements connected together inside the casing and the casing is filled with an insulating fluid. The capacitor units are mounted in a rack of insulating material constituting the sole support for the capacitor units as well as electrically insulating the capacitor units from one another. The rack includes guide members for at least part of the gas circulating in the tank to achieve substantially the same temperature in the individual capacitor units.

3 Claims, 12 Drawing Figures

CAPACITOR BANK

The present invention relates to a capacitor bank for use in high voltage electric plants such as series or shunt capacitors or in filter circuits for high voltage direct current plants.

Capacitor banks of the above-mentioned types are normally placed outdoors. The capacitors are arranged on an elevated platform which may be insulated from earth. The insulating level is determined by the operating voltage of the bank. Sometimes, in addition, insulators and platforms are placed at such a high level that live parts are located at a safe distance from the ground to prevent human beings from getting into contact therewith.

All considerations that must be paid to the insulation and human protection imply that an outdoor capacitor bank becomes very large in both area and volume. This causes disadvantages, particularly if the plant is located in a densely populated area where also aesthetical views must be taken into consideration. Other factors which must be regarded are the risk of lightning strokes, contamination, icing, and also sabotage or other more or less deliberate damage to the plant which may cause operational disturbances.

The basic principle of the present invention is to provide a capacitor bank in which the above-mentioned drawbacks are eliminated to the greatest possible extent.

In the construction of the capacitor bank the principle of enclosing an electrical apparatus in a gas-tight tank and filling this with an insulating gas, preferably $SF_6$, has been applied, this principle being known from other fields of the high voltage technique. However, this gives relatively large casings, largely due to the insulating distances that must be maintained between the individual capacitors and above all between the tank and the electrically conducting platform. By arranging the capacitors in a rack of electrically insulating material, according to the invention, a considerable reduction of the necessary space for the bank is obtained. It is not necessary to pay regard to the insulating distance between live parts and earth and the stack itself will constitute the necessary insulation between the individual capacitors. The considerably reduced volume of the tank thus obtained results in a correspondingly reduced amount of $SF_6$ gas.

If the temperature is maintained above a certain minimum level, an increased margin to the occurrence of dielectric partial discharges is obtained, which leads to increased safety of operation. This can also be utilized for increasing the electrical stress. An increased electrical stress in the dielectric results in increased unit power, that is, a more compact construction of the bank. The increased margin with respect to partial discharges can also be utilized to make the capacitors less sensitive to transients. A suitable minimum temperature in the application discussed here is about $+10°$ C.

It is known that the life of a capacitor decreases with increasing temperature; however maximum life is obtained at a dielectric temperature of around $+60°$ C. By cooling the bank, thus limiting the maximum ambient and the hot-spot temperature, the life of the capacitor will therefore increase.

The capacitors operate best if the dielectric can be maintained within a limited temperature range, which can be set at between $+5°$ C and $+60°$ C, but which should be held as constant as possible to obtain the best conditions. The temperature of the cooling gas should therefore preferably not exceed $+40°$ C but may amount to $+55°$ C for brief intervals. With a thermostat-controlled limitation of the temperature range within which the capacitors are to operate, an improved stability and reduced variation in capacitance and losses is obtained, which makes it possible to incorporate a better tuned and more sensitive protection equipment which provides a higher degree of reliability.

The use of an insulating rack according to the invention results in the following advantages:

A considerable reduction of the volume of the tank in which the capacitor bank is placed.

A corresponding reduction of the required volume of $SF_6$ gas. This reduction of the gas volume allows a more rapid and smooth regulation of the temperature range within which the bank operates.

Series-connection of units will be easily performed. No sub-division of the stack into racks because of voltage will be necessary. Inter-rack insulators will not be necessary to use, which results in lower costs and less space. The simplified connection makes it easier to modulize or modify the construction for more capacitors, more racks, etc.

Units with one small bushing can be used. This results in lower cost, less risk of leakage, increased reliability, and also smaller space.

The fact that no sub-division of the stack due to voltage is necessary makes it possible to reduce the unit voltage. This means fewer series-connections in the unit, more elements in parallel, higher reliability, and lower unit cost.

Since arcs must not be formed in $SF_6$, normal expulsion type external fuses for the capacitors may not be used. Capacitors with internal element fuses are therefore preferable, and the advantage of a smaller tank volume is also gained.

When cooling the units with circulating gas, the flow of the cooling gas must be controlled so that an even distribution over all units is obtained. This is also true, of course, in the case of a low external temperature when it may be necessary to heat the units. To minimize the number of screens, tubes and ducts, a construction is used with the capacitors mounted around a shaft which constitutes a feeder channel for the cooling gas. The capacitors are then mounted at such a distance from each other that the space between them will work as cooling gas channels. This makes it possible to effectively cool the largest surfaces of the capacitors.

To obtain a more uniform temperature in the tank, it may sometimes be suitable to insulate it thermically.

What characterises the invention will be clear from the claims.

In the following capacitor bank according to the invention will be described with reference to the accompanying drawings.

Of these FIG. 1 is a side view of the bank.

FIG. 2 is a side view from the short side of the bank,

FIG. 3 being a top view of the bank.

FIGS. 9, 10, 11 and 12, respectively, show the same as FIGS. 1, 2, 5 and 6, respectively, but with a different cooling arrangement.

Figure 1:
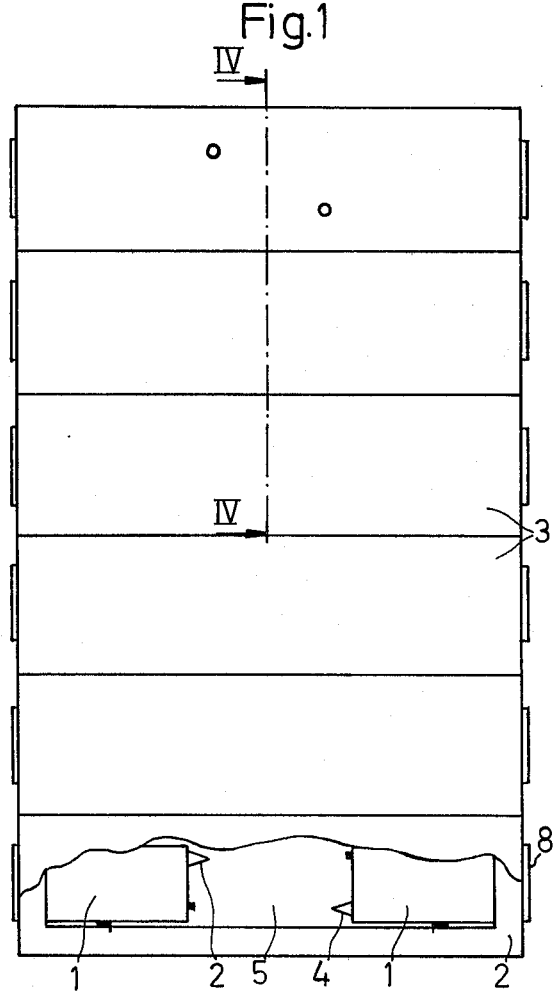
Figure 2:
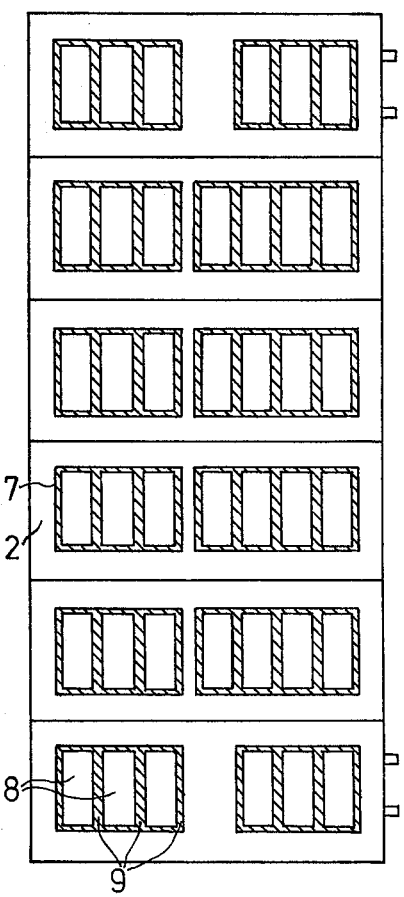
Figure 3:
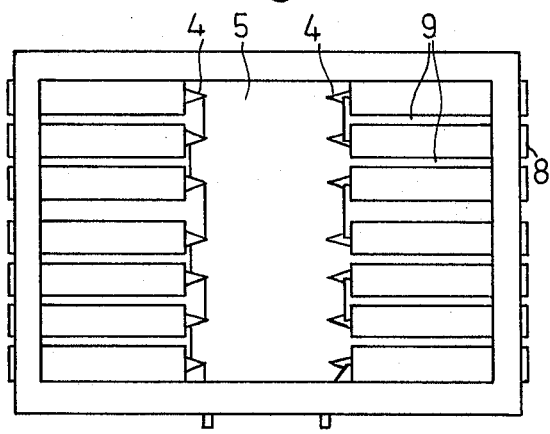

From FIGS. 1, 2 and 3 it is clear that a number of capacitor units 1 are arranged in a rack 2 of insulating material. On its long sides the rack is covered with plates 3 of insulating material. In FIG. 1 the lower part of the lowermost plate is cut away, thus revealing the rack and the lower capacitor units. As will be seen from this figure, the units are placed with their bushings 4 facing inwardly towards a shaft 5 passing through the stack, said shaft extending from the bottom of the stack to its top and from one long side to the other, which is also clear from FIG. 3 which is a view from the bank top, a plate covering this top being removed. On the short sides of the bank, as will be clear from FIG. 2, there are arranged openings 7 in the stack, through which openings the bottom 8 of the capacitor units project.

Figure 5:
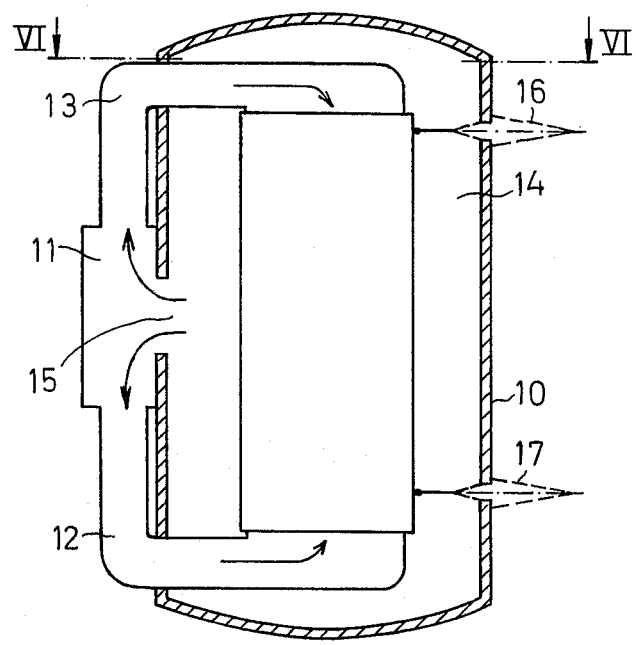
FIG. 5 shows a view partly in section of a bank located in a tank.
Figure 6:
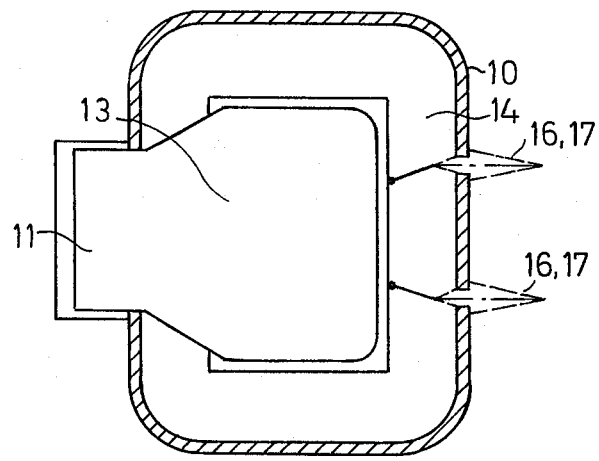
FIG. 6 is a section along the line VI—VI of FIG. 5.

The individual capacitor units are arranged in such a way in the stack that narrow gaps or channels 9 are formed betweem them, said channels extending from the shaft 5 to the space outside the short sides of the bank. As shown in FIGS. 5 and 6, the bank is enclosed in a tank 10 and from a container 11 there is pumped gas, which may be $SF_6$, through conduits 12 and 13 to the bottom and top, respectively, of the bank and into the shaft 5. From the shaft the gas flows through the gaps 9 out into the space 14 between the bank and the tank and from there through an opening 15 and back to the container 11. In the container 11 there are pumps for circulating the gas and, in addition to this, there may be devices for maintaining the gas at a certain temperatore for cooling or heating of the capacitor units. These temperature devices are suitably controlled by a thermostat, so that the circulating gas has such a temperature that the capacitor units are maintained at the desired working temperature. Normally it will be a question of cooling the units, but in case of cold weather and when energizing the bank it may be appropriate to heat the gas. As an alternative it is also possible to cool the gas by arranging cooling flanges on the outside of the tank, as applied in self-cooled transformers.

Figure 4:
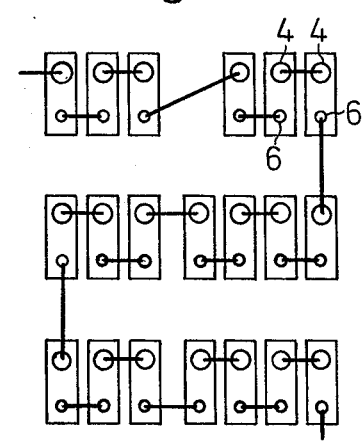
FIG. 4 is a section along the line IV—IV in FIG. 1 and shows the electrical connections.

By arranging the capacitor units, as shown in FIG. 3, with the capacitor unit bushings on both sides of the stack facing each other, the potential gradient is minimized for projecting parts such as bushings 4 and connection bolts 6 arranged on the cases of the units. FIG. 4 shows the electric connection of the row of capacitor units arranged on one side of the stack. From this figure it is clear that the units are series-connected. This row is parallel-connected with the row of units which is arranged at the other side of the stack. This means that bushings and connection bolts which are located opposite to each other have the same or almost the same potential, so that the field strength across the shaft is low and that the width of the shaft is substantially determined by the fact that a sufficient volume of cooling gas shall be supplied.

Figure 7:
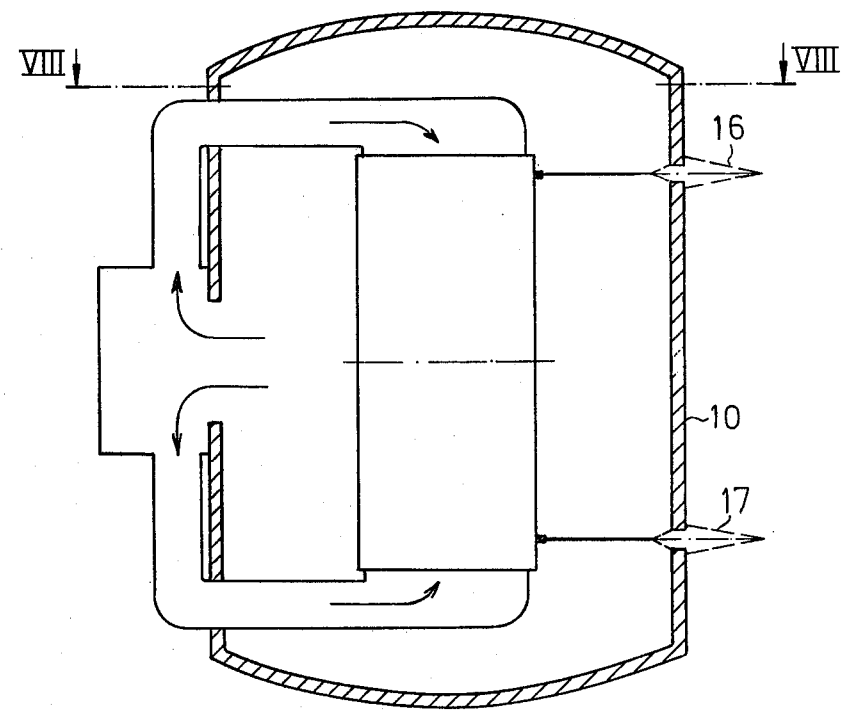
FIGS. 7 and 8 show the same as FIGS. 5 and 6, but here the tank has circular cross-section.
Figure 8:
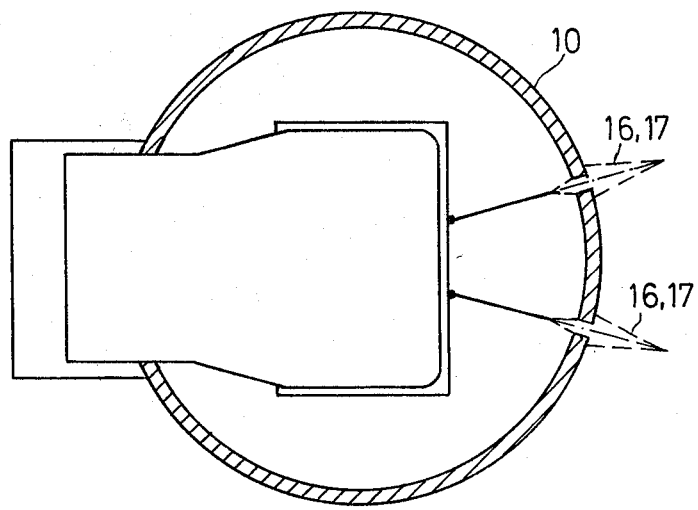
Figure 10:
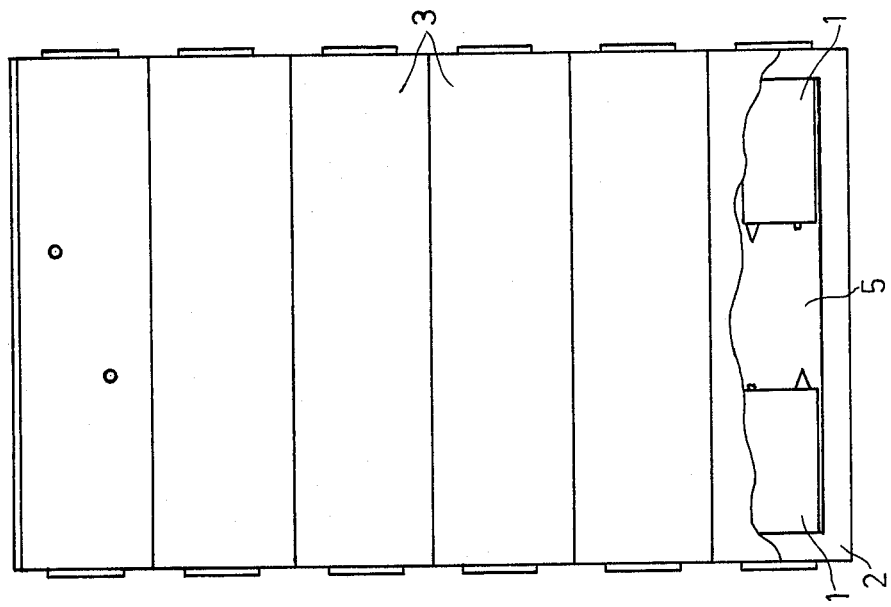

The outputs from the two ends of the capacitor rows are connected to bushings 16 and 17 which are arranged in the wall to the tank 10, as is clear from FIGS. 7 and 8.

Figure 9:
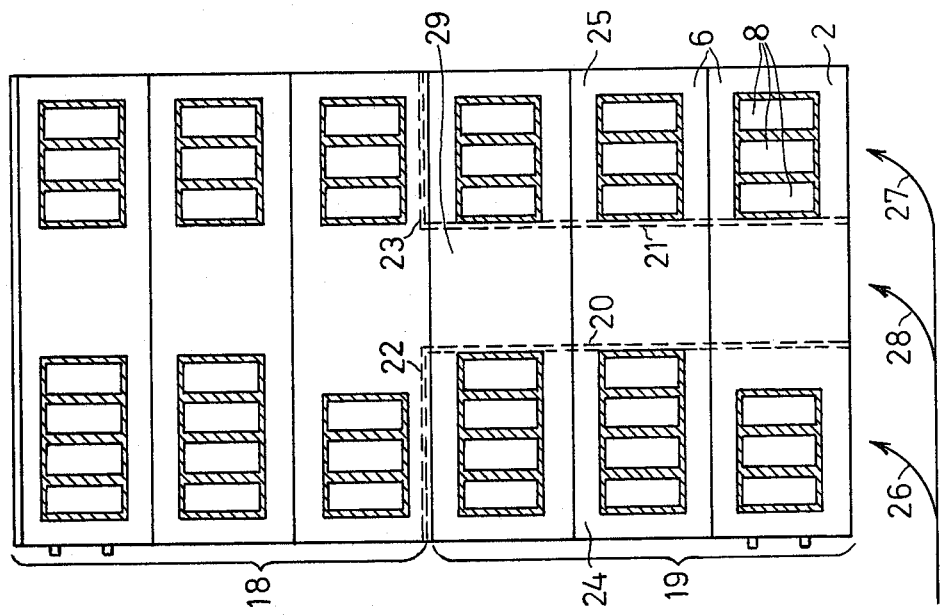
Figure 11:
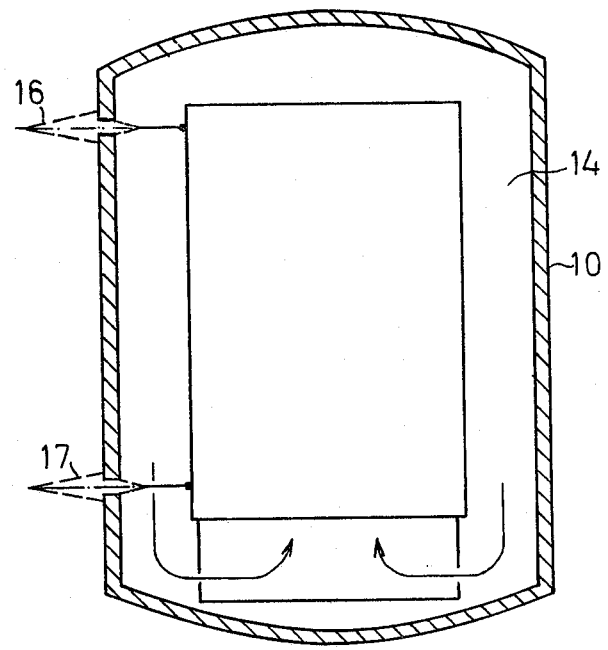
Figure 12:
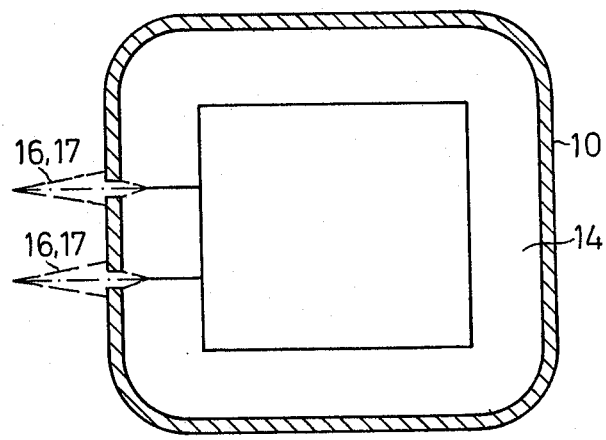

As an alternative to the embodiment, shown in FIGS. 1–8, of the cooling with injection of coolant in both the upper and lower ends of the capacitor bank, FIGS. 9 – 12 show the coolant being supplied only from the bottom. In order to achieve an acceptable uniformity of volume and temperature of the coolant, the bank according to FIG. 9 is divided into an upper and a lower portion 18 and 19, respectively, separated from each other by means of two vertical walls 20, 21 and two horizontal walls 22, 23. The two vertical walls 20 and 21 extend throughout the bank from one short wall to the other, thus dividing the lower half 19 of the bank into two parts, designated 24 and 25 in FIG. 9. The two walls thus form a shaft 29 having its lower end at the bottom of the bank and opening out at the upper half of the bank. Coolant is supplied to the lower half of the bank, partly in the left-hand portion 24, partly in the right-hand portion 25, which is indicated by the arrows 26 and 27. To the upper half 18 coolant is led according to the arrow 28 through the shaft 29, so that the lower half and upper half of the bank, respectively, are cooled in parallel. In this embodiment the upper end of the battery is covered with a plate so that all gas which is injected from below through the two side channels 5 into the two lower bank portions 24 and 25 cools the lower half of the bank, and all gas flowing upwards through the shaft 29 according to the arrow 28 cools the upper half of the bank.

FIGS. 5 and 6 show that the tank 10 has substantially rectangular cross section, whereas FIGS. 7 and 8 show the use of a circular tank. Which shape to use must be determined from time to time. A tank having rectangular cross section may in some cases be easier to place and transport, whereas a tank with circular cross section may be more suitable if high pressure of the gas is preferred.

We claim:

1. A capacitor bank for use in high voltage electric plants, comprising capacitor units:

a rack of insulating material for supporting and electrically insulating said capacitor units from one another;

a tank enclosing said rack and said capacitor units and including an insulating fluid for regulating the temperature in said tank;

said rack including guide conduits for circulating at least part of said fluid to each of said capacitor units to maintain the temperature thereof at a predetermined value;

said capacitor units are mounted within said rack to provide channels between the capacitor units and between the capacitor units and the tank for circulation of said fluid therein, and said capacitor units are mounted in two spaced columns, the capacitors in each column being mounted with their respective terminal bushings extending into the space formed between said two columns;

said rack includes wall members for separating the rack into an upper and a lower half and in turn for separating each of said upper and lower halfs into two columns with a shaft extending therebetween from said lower half to said upper half; and said tank including conduits for introducing said fluid into said shaft and each of said columns.

2. A capacitor bank as in claim 1 wherein the temperature of said fluid is maintained at approximately 40° C.

3. A capacitor bank as in claim 1 wherein said channels extend entirely around the periphery of each of said capacitor units.

* * * * *